Oct. 5, 1937.  B. F. SCHMIDT  2,095,039
BRAKE
Filed Feb. 5, 1934  3 Sheets-Sheet 1
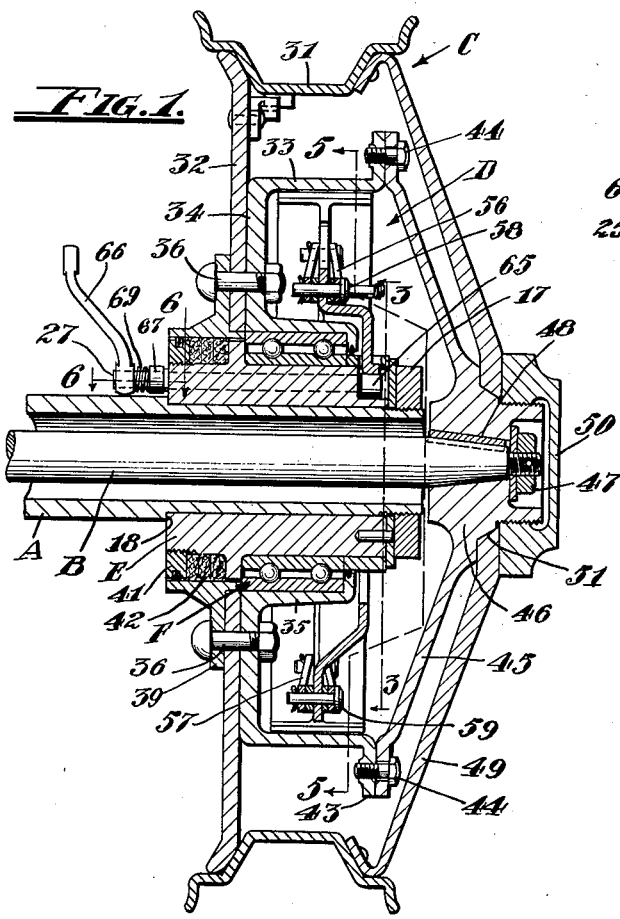
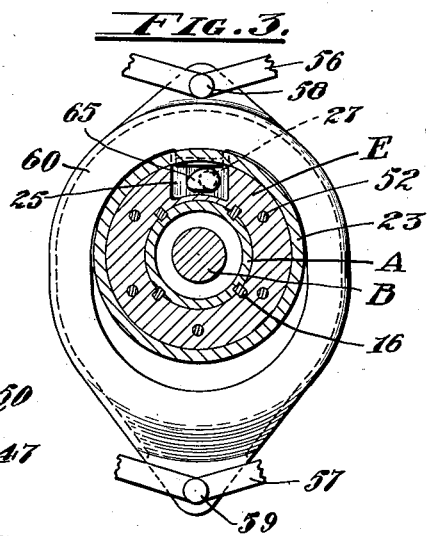
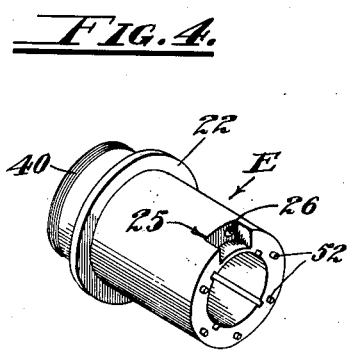
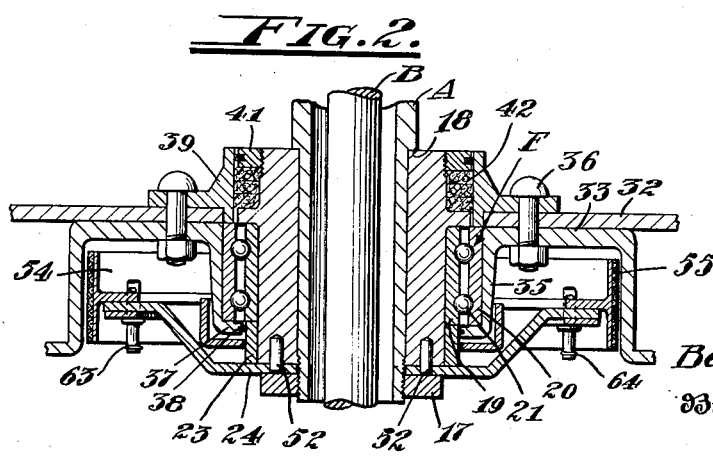
Inventor
Benjamin F. Schmidt.
Attorney Oct. 5, 1937. B. F. SCHMIDT 2,095,039
BRAKE
Filed Feb. 5, 1934 3 Sheets-Sheet 2
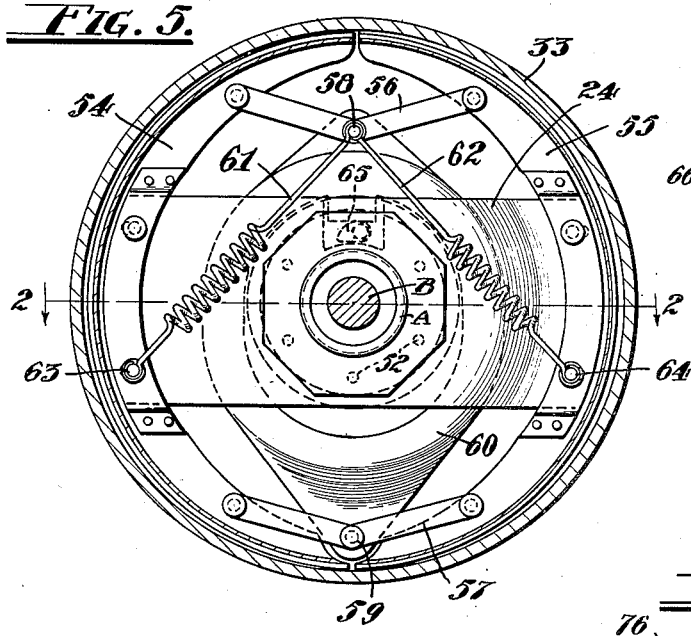
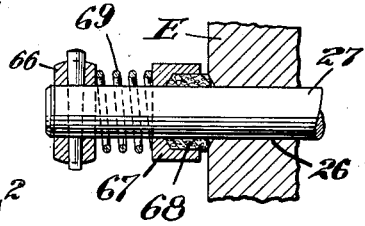
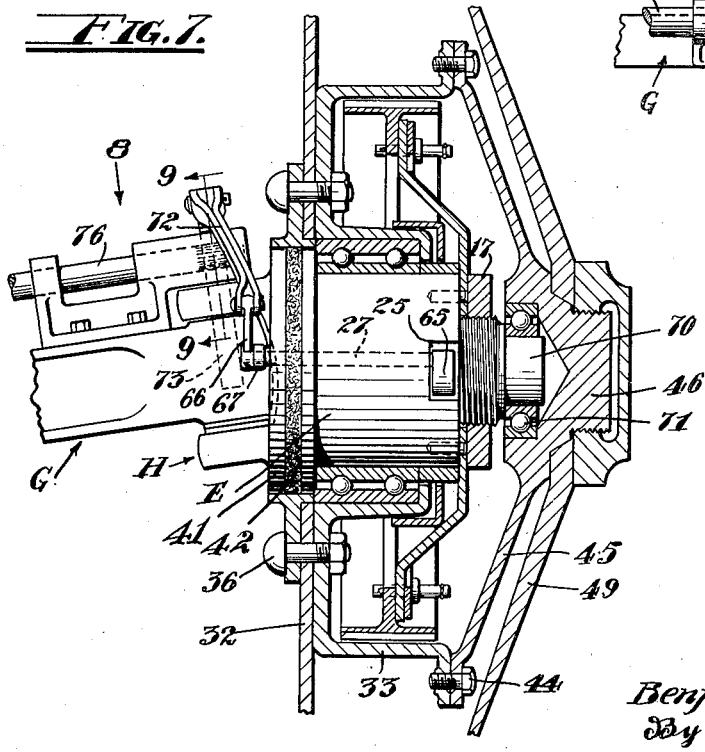
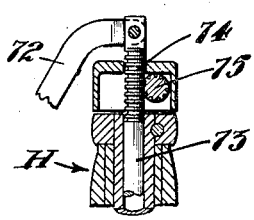
Inventor
Benjamin F. Schmidt,
By
R. S. Berry
Attorney

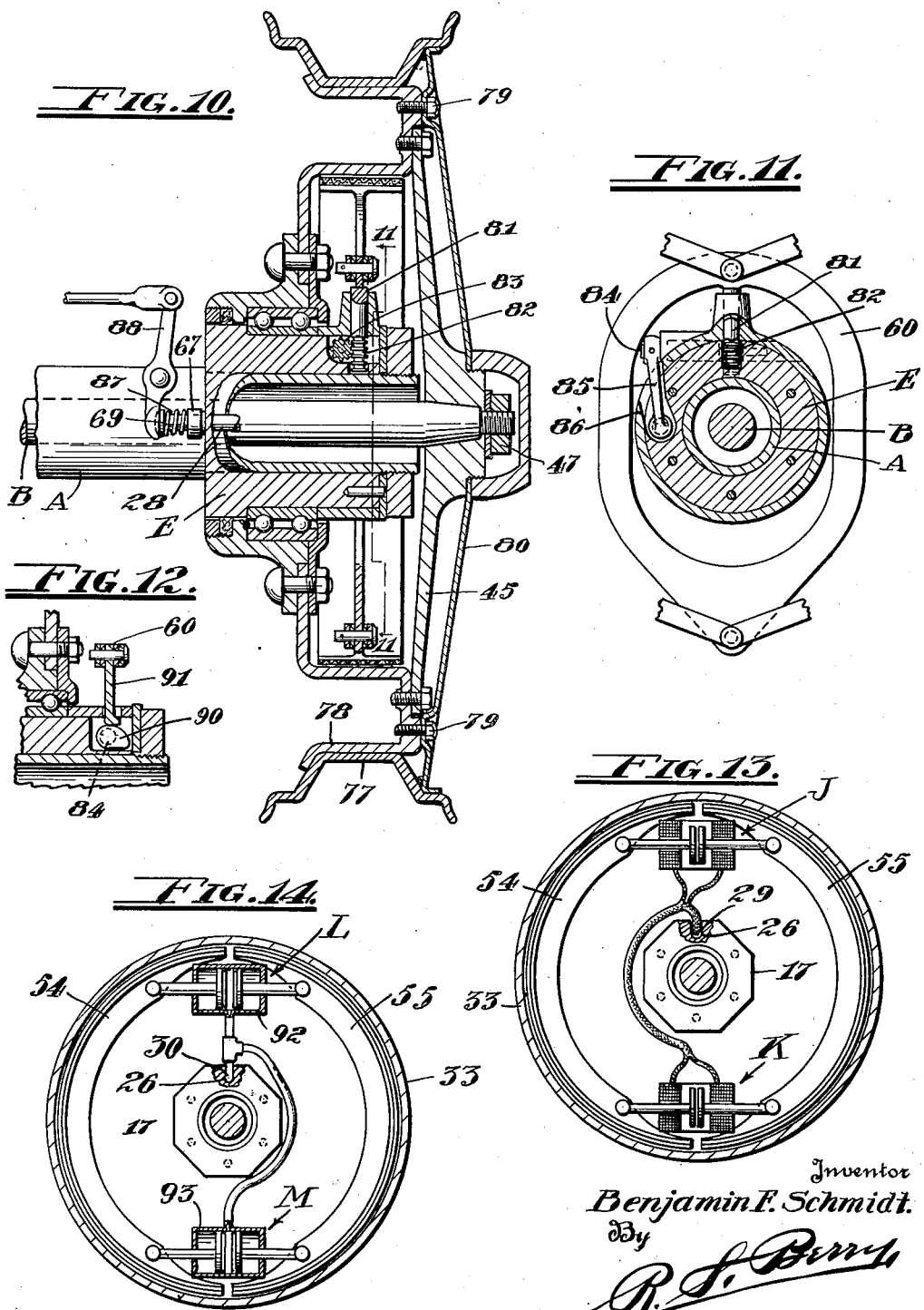

Patented Oct. 5, 1937

2,095,039

UNITED STATES PATENT OFFICE 2,095,039

BRAKE

Benjamin F. Schmidt, Los Angeles, Calif.

Application February 5, 1934, Serial No. 709,816

2 Claims. (Cl. 188—18)

This invention relates to a brake for vehicle wheels such as are employed on automobiles, trucks, aeroplanes and the like, and more particularly pertains to vehicle wheel brakes of the type in which the brake mechanism is incorporated in a wheel structure.

An object of the invention is to provide a brake and wheel construction in which the brake mechanism is arranged so as to be accessible for adjustment and repairs from the exterior of the wheel and from the outer side face thereof.

Another object is to provide a brake and wheel construction in which the brake mechanism may be completely housed or inclosed in a manner to adequately protect the braking elements from water, ice, gritty material and other substances which interfere with the durability of the brake or with its effectiveness in operation.

Another object is to provide a brake and wheel construction of the above character in which the parts are so mounted and arranged that the brake operating mechanism may be readily connected to the brake structure from the inner side of the wheel, and the various parts of the structure readily assembled and removed and replaced.

With the foregoing objects in view together with such other objects and advantages as may subsequently appear, the invention resides in the parts and in the combination, construction and arrangement of parts hereinafter described and claimed and illustrated by way of example in the accompanying drawings in which:

Fig. 1 is a view in vertical section of a wheel and brake structure embodying the invention and showing it as applied to a rear wheel of a motor vehicle, as where the wheel is revolubly mounted on an axle housing;

Fig. 2 is a detail in horizontal section as seen on the line 2—2 of Fig. 5;

Fig. 3 is a view in section and elevation as seen on the line 3—3 of Fig. 1 in the direction indicated by the arrows;

Fig. 4 is a detail in perspective of the wheel bearing sleeve showing it as detached;

Fig. 5 is a view in section and elevation as seen on the line 5—5 of Fig. 1 in the direction indicated by the arrows;

Fig. 6 is a detail in horizontal section taken on the line 6—6 of Fig. 1;

Fig. 7 is a fragmentary view of the wheel and brake structure showing it as applied to a wheel carried on a steering knuckle, as in a motor vehicle front wheel;

Fig. 8 is a plan view with portions broken away as seen in direction of the arrow 8 in Fig. 7;

Fig. 9 is a detail in section taken on the line 9—9 of Fig. 7;

Fig. 10 is a view in vertical section partly in elevation, showing a modification of the invention as applied to a vehicle rear wheel;

Fig. 11 is a view in section and elevation taken on the line 11—11 of Fig. 10;

Fig. 12 is a detail in section illustrating a modified form of the brake actuator shown in Figs. 10 and 11;

Figs. 13 and 14 are views in section and elevation illustrating modified forms of the brake actuating means.

Referring to the drawings more specifically, particular reference now being had to Figs. 1 to 5, inclusive, A indicates a conventional cylindrical tubular axle, or axle housing, B designates a revoluble axle shaft extending concentrically through the axle housing, C denotes generally a wheel structure revolubly mounted on the axle housing and connected to the axle shaft B, and D indicates generally a brake structure embodied in the wheel structure.

In carrying out the invention a cylindrical bearing sleeve E, particularly shown in Fig. 4, is rigidly mounted on the outer end of the axle housing A, being connected to the latter by keys 16, as shown in Fig. 3, and being held against longitudinal movement relative to the axle housing by a nut 17 screwed on the outer end of the latter whereby the sleeve E is crowded against a shoulder 18 on the axle housing as particularly shown in Fig. 2; the outer end of the axle housing being threaded to receive the nut 17. The sleeve E constitutes a bearing element for the wheel C, it being here shown as fitted with an anti-friction bearing F embodying a pair of spaced rings 19 and 20 between which are interposed ball-bearings 21 arranged in the usual race-ways formed in the bearing rings. It will be manifest that any conventional bearing construction may be employed in which the sleeve E will constitute an inner bearing member. For example in some instances ball or roller bearings may ride directly on the outer periphery of the sleeve, and in other instances such roller bearing elements may be dispensed with and the outer surface of the sleeve E then employed as an inner friction bearing surface. The sleeve E is formed with an annular flange 22 intermediate its ends against which the bearing F abuts and is retained by the nut 17; a filler ring 23 being interposed between the outer end of the bearing ring 19 and a brake supporting plate 24 carried on the outer end of the sleeve and against which plate the nut 17 bears.

The sleeve E is formed at one end thereof with a recess 25 which opens to the side of the sleeve, and leading from the recess 25 and extending longitudinally through the sleeve is a passageway or bore 26 through which operative connection may be made between the brake structure D and a brake operating means remote from the wheel.

In the construction shown in Figs. 1 and 7, a rock shaft 27 extends through the bore 26, and in the construction shown in Fig. 10 a reciprocal shaft 28 is inserted through the bore. Where the brake is to be electrically operated a conductor 29 is passed through the bore as shown in Fig. 13, and where the brake is hydraulically operated a conduit 30 is passed through the bore as shown in Fig. 14.

The wheel C, in the construction shown in Fig. 1, embodies a channeled rim 31 which is adapted to receive a resilient tire in a conventional manner and which rim is demountably carried on an annular disk 32 constituting the rear side face of the wheel. The disk has detachably secured to its outer face a brake drum which embodies a cylindrical outer wall 33 formed on an annular plate 34 on the inner periphery of which plate 34 is formed a cylindrical wall 35 spaced concentrically from the wall 33 and constituting the wheel hub and also a bearing housing; the wall 34 being carried on the disk 32 by bolts 36.

The hub or housing 35 encircles the bearing ring 20 in frictional engagement therewith and has an inner annular flange 37 on its outer margin carrying a wiper 38 which seats on the filler ring 23 and forms a sealed contact with the latter.

Extending rearwardly from the disk 32 is a ring 39 engaged by the bolts 36 which ring encircles and is spaced from the inner end of the bearing sleeve E to form the outer wall of a packing gland; the inner end of the sleeve E being formed with screw threads, as indicated at 40 in Fig. 4, on which is screwed a crowding ring 41 between which and the flange 22 is interposed packing material 42. This packing gland serves as a seal to render the inner end portion of the bearing water and dirt proof.

The outer margin of the brake drum 33 is formed with a flange 43, to which is demountably secured by bolts 44, a disk 45 which extends over the front of the brake drum and affords a demountable closure therefor and is designed, in association with the walls 33, 34 and 35 of the brake drum, to completely enclose the brake mechanism D to shield the latter and provide a water and dust proof chamber within which the brake mechanism is enclosed. By this arrangement access may be had to the brake structure only from the front or outer side of the wheel. The disk 45 is formed with a cylindrical hub 46 which is secured to the outer end of the shaft B in a conventional manner as by tapering the outer end of the shaft, inserting the tapered portion through a tapered opening in the hub 46, screwing a nut 47 on the outer end of the shaft, and engaging the hub 46 to the shaft by a key 48. The disk 45 thus also serves as a connection between the shaft B and the wheel structure through the brake drum.

Connecting with the outer side portion of the wheel rim 31 is a face plate 49 which extends over the disk 45 and is formed with a central opening through which the outer portion of the hub 46 extends; a cap 50 being screwed on the outer end of the hub 46 and being formed to bear against the central portion of the disk 49 to clamp the latter onto a taper 51 formed on the hub 46.

The brake supporting plate 24 carried on the outer end of the bearing sleeve E is secured to the latter by pins 52 to hold the plate rigid; the plate extending horizontally on opposite sides of the sleeve to form brackets on the outer ends of which are movably carried a pair of brake shoes 54 and 55 connected together at their adjacent ends, as shown in Fig. 5, by pairs of toggle links 56 and 57. The inter-connected ends of the links are secured by pivots 58 and 59 to diametrically opposite sides of an elongated ring 60 encircling the outer end of the sleeve E and vertically shiftable diametrically thereof. A pair of springs 61 and 62 lead divergently downward from the pivot 58 and connect with the brake shoes 54 and 55, as indicated at 63 and 64, which springs serve to normally maintain the brake shoes retracted relatively to the brake drum and also yieldably maintain the ring 60 in a lowermost position as shown in Fig. 3.

It will be seen that the brake mechanism including the brake shoes, their link interconnections, their normal retracting means, and their actuating ring, are carried on the supporting plate 24 whereby on removing the cover from the brake drum and detaching the nut 17, the operating assembly of the brake mechanism may be removed from the brake drum as a unit by pulling the plate 24 out of engagement with the bearing sleeve E. By this arrangement the entire brake assembly may be easily removed and replaced thus facilitating renewal or changing of the brake mechanism, and permits the provision of complete brake units carried by a plate 24 as a standard assembly adapted for renewal and replacement purposes. In other words, when the brake becomes excessively worn the unit may be removed and replaced by either a new unit or a previously repaired unit thereby obviating necessity of delay occasioned by repairing brakes as now commonly practiced.

Mounted on the inner end of the rock shaft 27 and disposed in the recess 25 is an eccentric 65 which is arranged to bear against the upper inner peripheral portion of the ring 60 to effect upward movement thereof in opposition to the springs 61 and 62 on rocking the rock shaft in one direction and thereby effect application of the brake. The shaft 27 is fitted at its outer end with a crank 66 for connection with the usual brake operating lever, not necessary to be here shown.

In order to afford a seal for the outer end of the bore or passage 26 through which the shaft 27 extends, a cup-shaped sleeve 67 is mounted on the shaft 27 to slide longitudinally thereof between the crank 66 and the rear end of the bearing sleeve E, as particularly shown in Fig. 6, and carried within the sleeve 67 is a packing member 68 arranged to seat in a tapered channel at the outer end of the passage 26 to close the latter; a spring 69 being interposed between the crank 66 and the sleeve 67 which exerts a thrust on the latter to cause the packing 68 to bear under pressure against the bottom of the tapered channel at the end of the bore 26.

In the construction shown in Figs. 7, 8 and 9, showing the invention as applied to the front wheel of a vehicle, G indicates a front axle on which is carried a wheel spindle 70 and which spindle is connected to the axle G by the usual knuckle joint H. The spindle 70 is fitted with the bearing sleeve E in a manner substantially corresponding to the mounting of the sleeve E on the axle housing A previously described, and accordingly the axle housing A and the spindle 70 are in a sense equivalent structures in that they each afford a support for the bearing sleeve E around which the wheel structure revolves.

The brake structure and the wheel structure employed in the front wheel assembly are formed the same as described with reference to Fig. 1, excepting that the wheel structure is rotatably mounted on the spindle, being equipped with a ball bearing 71 which is interposed between the hub 46 of the plate 45 and the outer end of the spindle 70. In this front wheel assembly the crank 66 of the rock shaft 27 connects with a link 72 leading to the upper end of a stem 73 formed with rack teeth 74 engaged by a pinion 75 on a rock shaft 76, whereby on turning the shaft 76 the stem 73 may be moved up or down to effect rocking of the brake actuating shaft 27 which movement of the shaft 27 will actuate the brake mechanism through the cam 65 and actuating ring 60 in the manner of rear wheel assembly before described.

In the form of the invention shown in Figs. 10 and 11 the bearing sleeve E is mounted on the axle housing A as before described, but a modified form of the wheel structure and mode of operating the brake mechanism is employed. In this instance the wheel rim 77 is mounted on an inturned flange 78 carried on the outer end of the brake drum and is secured to the latter by bolts 79 engaging a face plate 80 constituting the front of the wheel, which face plate has its outer margin secured to the rim 77 as by welding and thus becomes a part thereof. By this arrangement the outer periphery of the brake drum is exposed so as to be air cooled. The brake mechanism in this instance corresponds to that described with reference to Figs. 1 and 5; it including the brake supporting plate, brake shoes, link connections between the brake shoes, an actuating ring, and the springs normally retracting the brake shoes.

The brake operating mechanism here shown consists of a stem 81 affixed to the ring 60 and which stem is formed with rack teeth 82 engaged by a pinion 83 on a rock shaft 84 carried in the bearing sleeve E, and which rock shaft is formed with a crank 85 projecting into a recess 86 in the sleeve in front of the end of the reciprocal stem 28 before referred to. The stem 28 is normally retained in a retracted position by a spring 87 and is adapted to be advanced by swinging a lever 88 so as to effect rocking of the lever 85 and shaft 84 and move the brake operating ring 60 up or down through the rack 82 and pinion 83. The reciprocal stem 28 is fitted with a gland to seal the passage 26 corresponding to that shown in Fig. 6. In the modified construction shown in Fig. 12 the rock shaft 84 is fitted with an eccentric 90 which bears against the under side of a stem 91 connecting with the ring 60 whereby on turning of the rock shaft 84 the ring 60 may be moved to actuate the brake.

In some instances it may be desirable to actuate the brake electrically in which event the brake shoes may be advanced by action of electromagnets J and K as shown in Fig. 13 in the manner common in magnetic brake construction; electric conductors 29 leading through the bore 26 of the sleeve E to effect transmission of the electric current from the inner side of the wheel to the magnets within the brake drum.

In like manner the brake shoes may be operated hydraulically as shown in Fig. 14, in which hydraulically operated plungers L and M are provided and connected to the opposite ends of the brake shoes 54 and 55; the plungers being mounted in cylinders 92 and 93 to which hydraulic fluid is directed through the conduit 30 passing through the bore 26 in the sleeve E, to actuate the brake shoes in a manner common in hydraulic brakes.

It will be seen from the foregoing that I have provided a wheel and brake construction in which the brake mechanism is completely housed and sealed against ingress of liquids or gritty substances from the exterior thereof, and in which access may be had to the brake mechanism for adjustments, repairs, or replacements from the outer side of the wheel and without necessitating demounting of the wheel from its bearings, and which is so constructed that it is applicable to the ordinary axle housing in rear wheel constructions and wheel spindles in front wheel constructions now generally in use. In other words the invention does not necessitate the provision of special axle or spindle constructions. It will further be noted that by the construction set forth the transmission means for actuating the brake mechanism interiorly of the drum leads from the inner side of the wheel at a point between the wheel bearing and the axle housing or wheel spindle.

I am aware that it is old in the art to equip wheels with brakes that are accessible from the outer face of the wheel structure, such for example as is disclosed in the patent to Strandt, Number 1,857,746, issued May 10, 1932, and accordingly I do not claim such feature as my invention; the present invention residing in improvements in details of construction and arrangement of parts in wheels of this character, as will now be set forth.

I claim:

1. In a vehicle wheel brake, a wheel, a brake drum on said wheel opening to the outer side thereof, a bearing for said wheel including a supporting sleeve around which said wheel and drum are revoluble, a mounting for said sleeve, a brake unit comprising brake shoes, a supporting plate carrying said shoes, and brake shoe operating means carried in said plate; and means for demountably connecting said unit to said sleeve from the outer side of said wheel including a clamping nut screwed on said sleeve mounting.

2. In a vehicle wheel brake, a wheel, a brake drum on said wheel, a supporting sleeve around which said wheel and drum are revoluble, a mounting for said sleeve, a brake unit comprising a pair of brake shoes, a supporting plate carrying said shoes, a ring encircling said sleeve and shiftable diametrically thereof, toggle links pivoted to and extending from diametrically opposite sides of said ring interconnecting adjacent ends of said brake shoes, springs connecting said supporting plate to said ring normally retaining said ring in a position to retract said brake shoes, and means for advancing said ring in opposition to said springs to apply the brakes to the drum.

BENJAMIN F. SCHMIDT.